United States Patent Office 3,235,447
Patented Feb. 15, 1966

3,235,447
ACARICIDAL AGENTS
Ewald Urbschat, Cologne-Mulheim, and Günter Unterstenhöfer, Opladen, Germany, assignors to Farbenfabriken Bayer Aktiengesellschaft, Leverkusen, Germany, a German corporation
No Drawing. Filed Jan. 22, 1964, Ser. No. 339,332
Claims priority, application Germany, Feb. 21, 1963, F 39,072
10 Claims. (Cl. 167—30)

The present invention is concerned with the use of known phenylhydrazones as acaricides.

It has already been disclosed that phenylhydrazones which are derived from benzaldehyde can be used for combating fungus diseases (rust) in grain in U.S. Patent No. 2,818,367.

It is an object of the present invention to provide new agents for combating mites. Another object of the invention consists in providing acaricidal agents which also destroy the eggs of mites. Further objects will be seen from the following description and the examples.

It has been found that the known phenylhydrazones of the formula

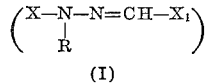

wherein

X stands for an aryl radical with up to 10 carbon atoms which may be substituted by alkyl, alkoxy, alkoxycarbonyl, amino groups and/or halogen,
$X_1$ stands for X, a heterocyclic radical and the group —CH=CH—$C_6H_5$, and
R stands for hydrogen or lower alkyl, possess strong acaricidal properties.

It must be regarded as definitely surprising that the substances to be used according to the invention possess a very strong acaricidal action, since it was known from the art that they have at best only weak fungicidal activity. It is especially surprising in this regard that the claimed substances also possess ovicidal properties as well.

The substances to be used according to the invention are clearly defined by the above Formula I. In this formula, X stands preferably for phenyl and naphthyl which can be substituted by alkyl, alkoxy and alkoxycarbonyl groups having 1 to 4 carbon atoms. Other preferred substituents include the amino group, the alkylamino group and the dialkylamino group, the alkyl radicals therein containing 1 to 4 carbon atoms in each case. Suitable halogen substituents include chlorine, bromine and fluorine. $X_1$ preferably stands for heterocyclic radicals with 5 to 6 ring members, such as pyridyl and furfuryl. $X_1$ may also be defined as a phenylvinyl group. R is preferably defined as hydrogen and lower alkyl radicals of 1–4 carbon atoms.

Specific examples of substances to be used according to the invention include: benzaldehyde-phenylhydrazone, benzaldehyde - naphthyl - hydrazone, benzaldehyde - N-methyl - phenyl - hydrazone, benzaldehyde - tolyl-hydrazone, p - chloro - benzaldehyde - phenylhydrazone, methoxy-benzaldehyde-phenylhydrazone, dimethylamino-benzaldehyde-phenyl-hydrazone, cinnamic aldehyde-phenylhydrazone, cinnamic aldehyde-chloro-phenylhydrazone and furfurol-phenylhydrazone.

Substances included within the present invention have been known for a long time. They can be produced, for instance, by causing suitable aldehydes to act on appropriate hydrazines, optionally in the presence of a solvent, such as an alcohol, at temperatures between 10 and 100° C. In general, the phenylhydrazones crystallize immediately. If this is not the case, the solvent may be driven off partly or completely in a vacuum.

Due to their properties the phenylhydrazones to be used according to the invention are suitable for combating mites at any stage of development. In particular, mites such as spider mites (Tetranychidae), the common spider mite (Tetranychus telarius), the fruit tree spider mite (Paratetranychus pilosus), gall mites such as the red current gall mite (Eriphyes ribis) and the tarsonemides such as Tarsonemus pallidus are found sensitive to the use of the active material.

In spite of their high acaricidal action, however, the active phenylhydrazones show only a low toxicity towards warm-blooded animals and a good compatibility with plants.

The substances according to the invention can be applied as such or in the form of customary compositions such as emulsifiable concentrates, spray powders, pastes, soluble powders, dusts and granulates. These are prepared in known manner (see, for example, Agricultural Chemicals, March 1960, pages 35–38). Suitable auxiliary agents include solvents such as aromatics (e.g. xylene, benzene), chlorinated aromatics (e.g. chlorobenzenes), paraffins (e.g. petroleum fractions), alcohols (e.g. methanol, butanol), amines (e.g. ethanolamine, dimethyl formamide), and water; also carrier substances such as natural rock flours (e.g. kaolins, clays, talc, chalk) and synthetic stone flours (e.g. highly dispersed silicic acids, silicates); emulsifiers such as non-ionic and anionic emulsifiers (e.g. polyoxyethylene-fatty acid esters, polyoxyethylene-fatty alcohol ethers, alkylsulphonates and arylsulphonates), and dispersing agents, such as lignin, sulphite waste liquors and methyl cellulose.

The active substances according to the invention may be present in the compositions in admixture with other known active ingredients, such as fungicides and acaricides.

The formulations generally contain between 0.1 and 95, preferably between 0.5 and 90 percent by weight of active substance.

The phenyl hydrazones or their formulations are applied in usual manner by spraying, sprinkling, dusting, scattering or atomizing.

In the following the acaricidal and ovicidal effect of phenylhydrazones is illustrated by a few examples.

The active substances are mixed with about three times their amount of dimethyl formamide and this concentrate is diluted with water to the desired concentrations with the addition of about 20% of nonyl phenol, referred to the active substance. Plants of the species Phaseolus vulgaris are sprayed with this emulsion until dew-moist. The plants are infested with spider mites of the species Tetranychus telarius at all stages of development.

The mortality of the post-embryonic stages is established after 72 hours, and the degree of effectiveness, i.e. the destruction of the population in percent, after 8 days. The results are assembled in the following Table 1.

TABLE 1

| | | Conc. in percent active substance/ emulsion | Destroyed after 72 hours in percent | Degree of effectiveness after 8 days in percent |
|---|---|---|---|---|
| 1 | Benzaldehyde-phenylhydrazone 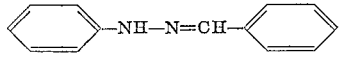 | 0.05<br>0.025<br>0.01 | 100<br>95<br>0 | 100<br>100<br>80 |
| 2 | Benzaldehyde-p-chlorophenylhydrazone 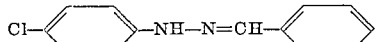 | 0.05<br>0.025<br>0.01 | 100<br>98<br>45 | 100<br>98<br>90 |
| 3 | Furfurol-phenylhydrazone 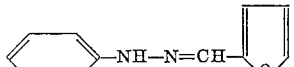 | 0.05<br>0.025<br>0.01 | 95<br>60<br>5 | 98<br>80<br>50 |
| 4 | p-Chlorobenzaldehyde-phenylhydrazone 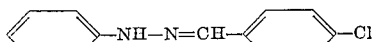 | 0.05<br>0.025<br>0.01 | 80<br>60<br>30 | 95<br>80<br>60 |
| 5 | p-Tolylaldehyde-p-chlorophenylhydrazone 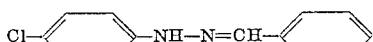 | 0.5<br>0.01 | 75<br>15 | 90<br>80 |
| 6 | p-Chlorobenzaldehyde-p-chlorophenylhydrazone  | 0.05<br>0.025 | 30<br>10 | 95<br>80 |
| 7 | Furfurol-p-chlorophenylhydrazone  | | | |
| 8 | p-Tolylaldehyde-phenylhydrazone 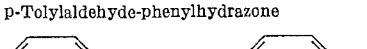 | 0.05<br>0.025 | 80<br>15 | 80<br>50 |
| 9 | Benzaldehyde-N-methyl-phenylhydrazone 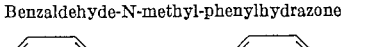 | 0.05<br>0.025 | 10<br>5 | 75<br>50 |
| 10 | Cinnamic aldehyde-phenylhydrazone 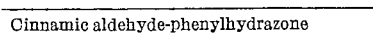 | 0.05 | 25 | 80 |
| 11 | Benzaldehyde-p-methylphenylhydrazone 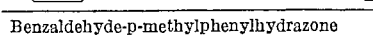 | 0.1<br>0.05 | 98<br>95 | 100<br>60 |
| 12 | Benzaldehyde-m-methyl-phenylhydrazone 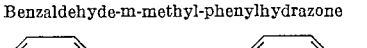 | 0.1<br>0.025 | 100<br>100 | 100<br>80 |
| 13 | Benzaldehyde-m-chlorophenylhydrazone 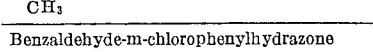 | 0.1<br>0.01<br>0.025 | 100<br>95<br>75 | 100<br>90<br>80 |
| 14 | Benzaldehyde-o-chlorophenylhydrazone  | 0.1<br>0.05 | 100<br>95 | 100<br>90 |

The production of the compounds is carried out by methods known as such and is illustrated by the following examples:

Example 1

BENZALDEHYDE-PHENYLHYDRAZONE 3.2 kg. of phenylhydrazine are run in a thin jet, while stirring, into 3.18 kg. of benzaldehyde in 30 litres of methanol. The condensation product separates with a slight rise of temperature. The mixture is then heated at 40–50° C. for 1 hour. After cooling, the almost colourless crystals are filtered off with suction, washed with cold methanol and dried at 40° C. in a vacuum. Yield 5.5 kg., M.P. 155–157° C.

Example 2

4-CHLOROBENZALDEHYDE-4-CHLOROPHENYL-HYDRAZONE 141 g. of 4-chlorobenzaldehyde in 250 cc. of alcohol are slowly introduced into a solution of 142 g. of 4-chlorophenylhydrazine in 200 cc. of warm alcohol. The mixture is subsequently heated to boiling for a short time and, after cooling, worked up as described in Example 1. 250 g. of yellowish crystals are obtained which melt at 151–153° C.

We claim:

1. A method for controlling mites which comprises applying to said mites a miticidal amount of a compound of the formula

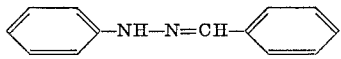

2. A method for controlling mites which comprises applying to said mites a miticidal amount of a compound of the formula

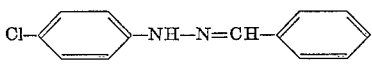

3. A method for controlling mites which comprises applying to said mites a miticidal amount of a compound of the formula

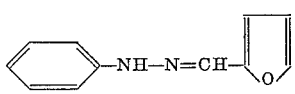

4. A method for controlling mites which comprises applying to said mites a miticidal amount of a compound of the formula

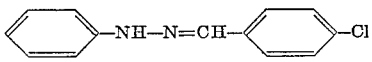

5. A method for controlling mites which comprises applying to said mites a miticidal amount of a compound of the formula

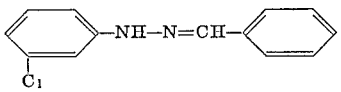

6. A method for controlling mites which comprises applying to said mites a miticidal amount of a compound of the formula

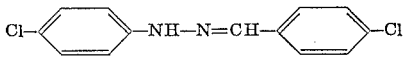

7. A method for controlling mites which comprises applying to said mites a miticidal amount of a compound of the formula

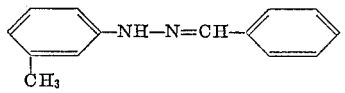

8. A method for controlling mites which comprises contacting the mites with a miticidal amount of a compound of the formula

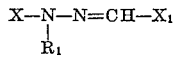

wherein

X is a member selected from the group consisting of phenyl, naphthyl and the corresponding substituted compounds having as substituent a member selected from the group consisting of halogen, alkyl, alkoxy, alkoxycarbonyl, amino, alkylamino and dialkylamino, the alkyl groups therein having from 1–4 carbon atoms;

$X_1$ is a member selected from the group consisting of X, pyridyl, furfuryl, and phenylvinyl; and $R_1$ is a member selected from the group consisting of hydrogen and alkyl of 1–5 carbon atoms.

9. A method for controlling mites which comprises applying to said mites a miticidal amount of a compound of the formula

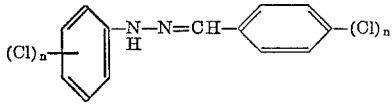

wherein $n$ is an integer of 0–1.

10. A method for controlling mites which comprises applying to said mites a miticidal amount of a compound of the formula

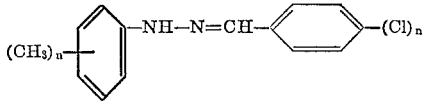

wherein $n$ is an integer of 0–1.

References Cited by the Examiner

Bollger et al., Chem. Abs. 45, 6335(h), 1951.

JULIAN S. LEVITT, *Primary Examiner.*